(12) United States Patent
Tawel (10) Patent No.: US 6,199,057 B1
(45) Date of Patent: Mar. 6, 2001

(54) BIT-SERIAL NEUROPROCESSOR ARCHITECTURE

(75) Inventor: Raoul Tawel, Glendale, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 08/956,890

(22) Filed: Oct. 23, 1997

Related U.S. Application Data (60) Provisional application No. 60/029,593, filed on Oct. 23, 1996.

(51) Int. Cl.[7] ........................................ G06F 15/18
(52) U.S. Cl. ........................ 706/30; 706/41; 706/27
(58) Field of Search ..................... 706/26, 42, 35, 706/30, 41, 27

(56) References Cited

U.S. PATENT DOCUMENTS

| | | | |
|---|---|---|---|
| 5,093,792 | 3/1992 | Taki et al. ........................... | 701/99 |
| 5,148,385 | * 9/1992 | Frazier ................................ | 708/426 |
| 5,175,858 | 12/1992 | Hammerstrom ..................... | 712/22 |
| 5,495,415 | 2/1996 | Ribbens et al. ..................... | 701/111 |
| 5,781,700 | * 7/1998 | Puskorius et al. .................. | 706/14 |
| 5,956,703 | * 9/1999 | Turner et al. ....................... | 706/27 |

OTHER PUBLICATIONS

Diaz et al, "A Full–Custom Bit–Serial Multiplier for Neural Network Algorithms", IEEE proceedings of the 7th Mediterranean Electrotechnical Conference, Apr. 1994.*

Johansson, H.O.; Larsson, P.; Larsson–Edefors, P.; Svensson, C.; "A 200–MHz CMOS bit–serial neural network", ASIC Conference and Exhibit, 1994. Proceedings., Seventh Annual IEEE International , 1994, pp. 312–315, Apr. 1994.*

Han, Gunhee and Sanchez–Sinencio, Edgar; "A General Purpose Discrete–Time Multiplexing Neuron–Array Architecture"; IEEE, 1995; pp. 1320–1323.*

* cited by examiner

*Primary Examiner*—George B. Davis
(74) *Attorney, Agent, or Firm*—Brooks & Kushman P.C.

(57) ABSTRACT

A neuroprocessor architecture employs a combination of bit-serial and serial-parallel techniques for implementing the neurons of the neuroprocessor. The neuroprocessor architecture includes a neural module containing a pool of neurons, a global controller, a sigmoid activation ROM look-up-table, a plurality of neuron state registers, and a synaptic weight RAM. The neuroprocessor reduces the number of neurons required to perform the task by time multiplexing groups of neurons from a fixed pool of neurons to achieve the successive hidden layers of a recurrent network topology.

15 Claims, 5 Drawing Sheets

BIT-SERIAL NEUROPROCESSOR ARCHITECTURE

RELATED APPLICATIONS

This application claims the benefit of U.S. provisional application Under 37 CFR 1.53(b)(2), Ser. No. 60/029, 593, filed Oct. 23, 1996.

ORIGIN OF INVENTION

The invention described herein was made in the performance of work under a NASA contract, and is subject to the provisions of Public Law 96-517 (35 U.S.C. 202) in which the Contractor has elected to retain title.

TECHNICAL FIELD

This invention relates generally to processor architecture and more particularly to a bit-serial based recurrent neuroprocessor architecture

BACKGROUND ART

Recently, considerably progress has been achieved in the use of neural network methodologies for both diagnostic and control applications of nonlinear dynamical systems. This progress is due in part to the use of context sensitive neural network architectures (as in recurrent networks) and in part to improved training methodologies (as with multistream training techniques). The bulk of previous efforts used static or feedforward networks, which were plagued by slow adaptation and large error rates. Architecturally, recurrent neural networks are simple extensions of feedforward networks where the network's neuron node outputs are no longer a function of their current inputs, but also of the recent time history of inputs via time-lagged connections.

In the automotive sector to date, this recurrent neural network formalism has been successfully applied and reported in the literature for several engine subsystems. These include the idle speed problem and the antilock brake problem (control problems) and the misfire detection problem (a diagnostic problem). In either case, the recurrent neuromorphic methodologies developed were trained to detect, identify and/or control improper events in an operating internal combustion engine. In order to utilize information from sensors now in production use, the diagnostic and control operations are based upon the temporal analysis of existing sensor outputs or dynamics. It has been demonstrated that the diagnostic and control tasks can be accomplished by the use of trainable classifiers of suitable capacity. These trainable classifiers, however, are based upon systems which require considerable computational resources and as such require dedicated hardware implementations in order to meet the real-time on-board computations requirements. While there exist a number of commercially available neural hardware implementations, none meet the specific design requirements needed for large scale commercial deployment in the automotive sector.

SUMMARY OF THE INVENTION

In accordance with the present invention a cost-effective hardware realization of an application specific integrated circuit (ASIC) neuroprocessor is provided that will enable the execution of on-board diagnostic and control tasks in real-time in production vehicles. The neuroprocessor architecture and hardware is sufficiently flexible to be able to perform the misfire diagnostic task and still have the capability of performing other diagnostics or control functions in automotive systems (i.e., idle speed control, air/fuel ratio control, etc.). This flexibility is achieved through the combined use of bit-serial design techniques, parallel hardware architecture, high speed design, and time-multiplexing the hardware building blocks to achieve maximum computational performance for the required task.

More specifically, the neuroprocessor architecture comprises a neural module containing a pool of neurons, a global controller, a sigmoid activation Read Only Memory (ROM) look-up-table, a plurality of neuron state Random Access Memory (RAM) registers, and a synaptic weight RAM. The neuroprocessor achieves its compactness by employing a combination of bit-serial and serial-parallel techniques in the implementation of the neurons and mimimizing the number of neurons required to perform the task by time multiplexing techniques, where groups of neurons from a fixed pool of neurons are used to configure the successive hidden layers of the recurrent network topology. Sufficient neuron resources are provided to address the most challenging diagnostic and control applications. In fact, of the most demanding neural network vehicular applications, the misfire detection problem, a candidate pool of sixteen silicon neurons was deemed to be sufficient. By time multiplexing, the sixteen neurons can be re-utilized on successive layers. This time-multiplexing of layers radically streamlines the architecture by significantly increasing hardware utilization through reuse of available resources.

BRIEF DESCRIPTION OF THE DRAWINGS

A more complete understanding of the present invention may be had from the following detailed description which should be read in conjunction with the drawings in which:

FIG. 7 is a schematic diagram of the accumulator of FIG. 5.

DETAILED DESCRIPTION OF PREFERRED EMBODIMENT

Figure 1:
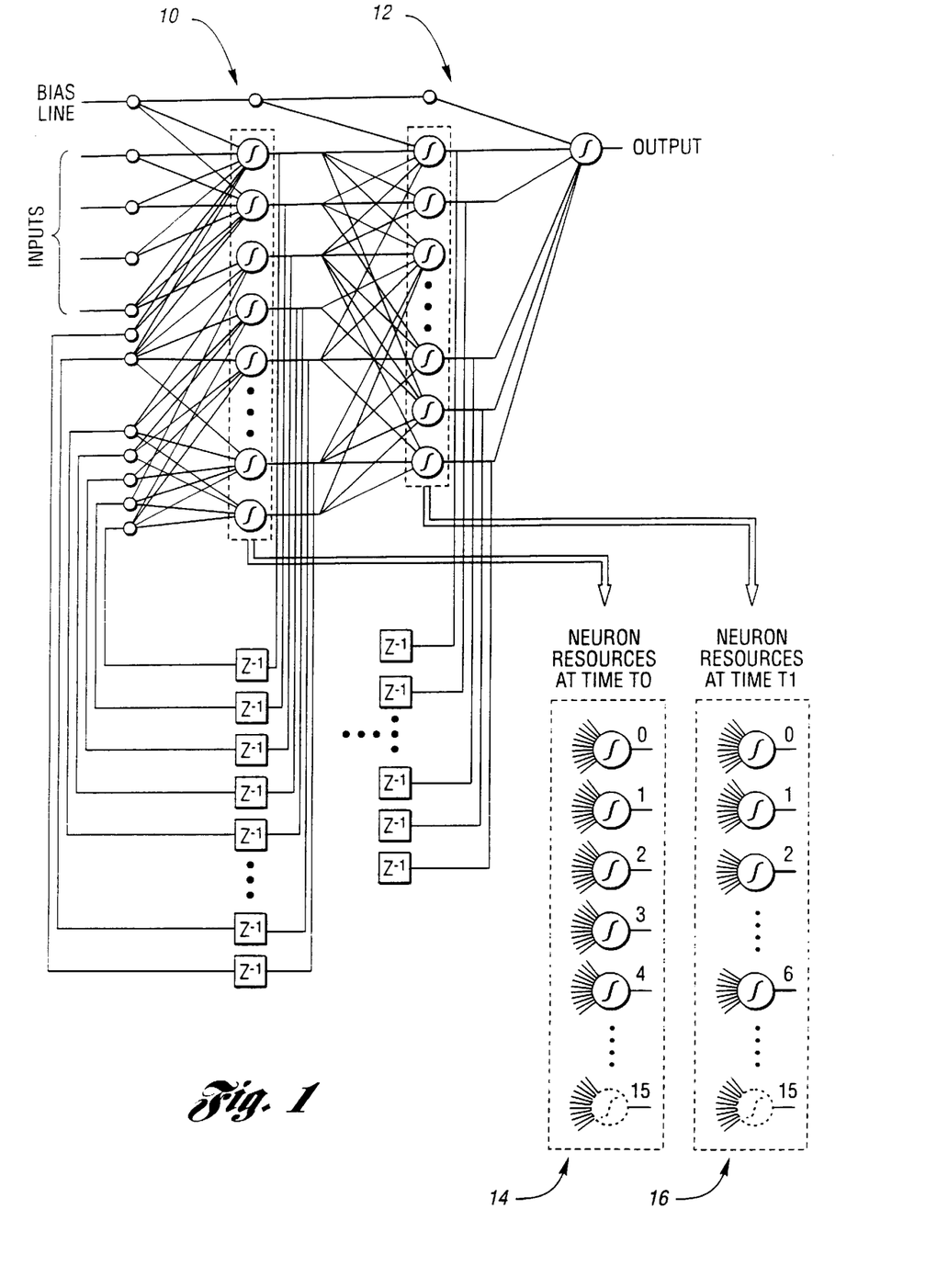
FIG. 1 shows the topology of a recurrent neural network of the present invention.

A schematic representation of recurrent network structure in accordance with the present invention is shown in FIG. 1. The basic element in neurocomputation is the neuron—which is a simple processing element. Neurons can be interconnected in various topologies by means of synaptic weights. Typically, neurons are organized into computational layers, i.e. slabs. Though arbitrarily complex network architectures can be constructed with these slabs—architectures with multiple levels of hierarchy and interconnectivity—practical applications intimately link the neural network structure to its proposed functional use. The simplest form of network, the multilayer perceptron, is one having an input layer of source nodes, any number of intermediate hidden layers, and a final layer of output neurons. The main goal for the hidden layer neurons is to enable the network to extract higher-order statistics from the data set. The output signals of the neurons in the final layer of the network together constitute the overall response to the activation pattern supplied to the source nodes on the input layer.

If the neurons are indexed by the subscript j, then the total input, $x_j$ to neuron j, is a linear function of the outputs, $y_i$, of all the neurons that are connected to j and of the weights $w_{ij}$ on these connections, i.e.

$$x_j = \sum_i y_i w_{ij} \quad (1)$$

Neurons can be provided with additional stimuli in the form of a bias by introducing an extra input to each unit which has a value of 1. The weights on this extra unit are called the bias weights and are equivalent to a threshold. Neurons have real-valued outputs, $y_j$, which are a nonlinear function of their inputs. The exact form of this equation can vary dependent on the application at hand. The activation function used in this VLSI architecture, the bipolar sigmoid, is given in equation (2).

$$y_j = -1 + \frac{2}{1+e^{-x_j}} \quad (2)$$

The neuroprocessor architecture of the present invention includes a neuronal module comprising a plurality of neurons, each of which performs the neuronal multiply and accumulate operation. The neurons receive as inputs, the synaptic weights and activations from input nodes, or from neurons on a previous layer, in a bit serial-parallel fashion. The neurons output the accumulated sum of partial products as given by equation (1). Because of the computational nature of neural networks—where information is sequentially computed a layer at a time—only enough neurons need be physically implemented in actual silicon as are required by the largest layer. In other words, if we denote the number of neurons in layer i of application j, $n_{ij}$, then the number of neurons implemented in silicon is given by $n_{max}$, where $$n_{max} = max(n_{ij}) \forall (i,j) \quad (3)$$

In the recurrent neural network applications of internal combustion engine misfire detection, or idle speed control, a candidate pool of sixteen silicon neurons is sufficient. By making use of a time multiplexing of layers approach to neurocomputation, the sixteen neurons can be re-utilized on successive layers. This time-multiplexing of layers radially streamlines the architecture by significantly increasing hardware utilization through reuse of available resources.

Time multiplexing or sequential processing issue becomes clearer once the flow of information in the neural network upon initiation of a computation is understood. Consider the network topology for the engine misfire detection problem, shown in FIG. 1. If input sensory data are presented to the neural network's four inputs at time t=0, the only active computations being performed in the network are strictly limited to those neurons receiving stimuli from the input layer neurons, i.e., neurons lying uniquely in the first hidden layer 10. All other neurons remain totally inactive. If the computation time of the neuron is defined by T, then at time t=T, all neurons in the first hidden layer will have computed their activations. Neurons in the first hidden layer can now play a passive role and simply broadcast their activations to neurons in the next layer, i. e., the second hidden layer 12, in a similar fashion. At this time, the only active neurons are those in the second hidden layer. The computation proceeds a layer of neurons at a time until all output neuron activations are finally computed. Thus, computations in a neural network are strictly performed a layer at a time sequentially progressing through the hierarchy of layers that compose the network architecture. In the example of FIG. 1, the assigned neuron resources (15 of 16) for the first hidden layer at time T0 is indicated at 14, and the assigned neuron resources (7 of 16) for the second hidden layer at time T1 is indicated at 16.

Figures 2, 3:
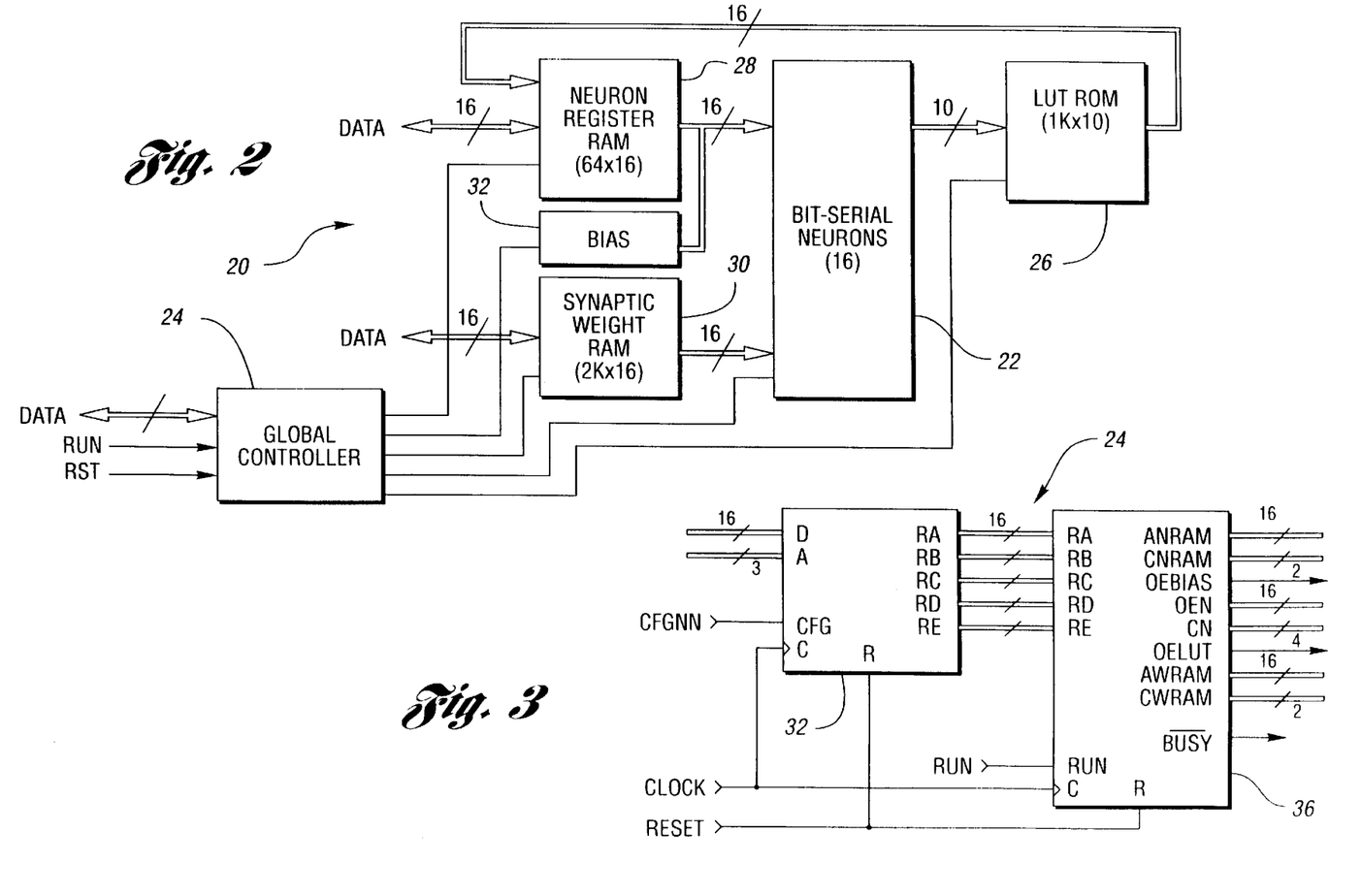
FIG. 2 is a block diagram of the neuroprocessor of the present invention.
FIG. 3 is a block diagram of the global controller of the neuroprocessor.

Referring now to FIGS. 2 and 3, a block diagram representation of the single chip stand-alone neuroprocessor of the present invention, generally designated 20, is shown. The chip was designed with the goal of minimizing the size of the neuroprocessor while maintaining the computational accuracy required for automotive diagnostic and control applications. The neuroprocessor architecture comprises a neural module 22, a global controller 24, a sigmoid activation ROM look-up-table 26, neuron state RAM registers 28, and synaptic weight RAM registers 30.

The neural module 22 performs the neuronal multiply and accumulate operations. Each neuron receives, as input, the synaptic weights and activations from input nodes (or from neurons on a previous layer) in a bit serial and bit-parallel fashion respectively, and outputs the accumulated sum of partial products as given by equation (1). The global controller 24 enables the neurochip to execute its required task of generating necessary control logic as well as orchestrating data movement in the chip. When there are no computations being performed, the global controller remains in an idle state. When a RUN command is issued, the global controller is in charge of providing control signals to the on-chip neurons, the RAM, and the ROM in order to proceed with the desired neurocomputation. Input activations are read out of the neuron state register RAM 28, synaptic weights are read out of the synaptic weight RAM 30, and both are propagated to the bank of neurons 22. The global controller keeps track of intra-layer operations as well as global inter-layer operations. Upon completion of a forward pass through the network architecture, the controller returns to the idle state. A bias term from the bias block 32 is propagated on the data bus to the neurons, in much the same way as the neuron inputs from the neuron storage RAM 28.

With reference to FIG. 3, the global controller 24 is made up of a configuration controller 34, and a run-time controller 36. Configuration of the hardware is performed by the configuration controller and requires the loading of five 16-bit registers that together explicitly define the topology of the current neural network application. The configuration controller 24 accepts as input, 16-bit data on bus D, a 3-bit address on bus A, a configuration control signal CFG, a clock C, and a global reset signal R. All signals feeding into the configuration controller are externally accessible. The 3-bit address bus internally selects one-of-five 16 bit configuration registers as the destination of the 16-bit data source D. By strobing the CFG control line, data can be synchronously loaded into any of the five architecture registers RA–RE. From an implementation perspective, the first four registers, registers RA–RD, uniquely define the topology of each layer in the neural network architecture. Thus, in this embodiment of the architecture there can be at most 4 layers in any recurrent neural network application—i. e., an input layer, an output layer, and two hidden layers. The 16-bit registers RA through RD each contain layer specific bit-fields (such as the number of neurons in the current layer and the number of recurrent connections within the layer) that collectively define the neural topology. Register RE defines the number of non-input layers in the neural network topology and since the number of layers is restricted to 4, only the lowest 2-bits are of significance. Once the five configuration registers are loaded, a unique network topology is defined, and the global controller can proceed to the run-time mode.

Once the configuration registers are loaded, control is passed to the run-time controller 36. At this stage, 2's complement binary coded data representing the input quantities that need to be processed by the neural network are loaded into the neuron state RAM module 28 at appropriate memory locations. The controller 36 remains in the idle mode for as long as the RUN line remains low. The low to high transition on the RUN line immediately resets the Active Low $\overline{\text{BUSY}}$ flag and initiates the execution of a single forward pass of the control hierarchy using the registers RA through RE as a template that together define the network's topology. The $\overline{\text{BUSY}}$ flag remains low until the neural network has completed the neurocomputation. It subsequently returns high after the contents of the output layer of the neural network have been placed back into appropriate memory locations of the neuron register RAM module 28. Once the $\overline{\text{BUSY}}$ flag goes high, the contents of the neuron RAM module are made available to the external world, and can be retrieved by the appropriate toggling of the RAM control lines. In this fashion, the output of the network can be read out and fresh inputs can be loaded into the hardware. The neuron RAM module 28 is a single port RAM, so once the neural network begins computations, the RAM module is inaccessible.

Figures 4, 5:
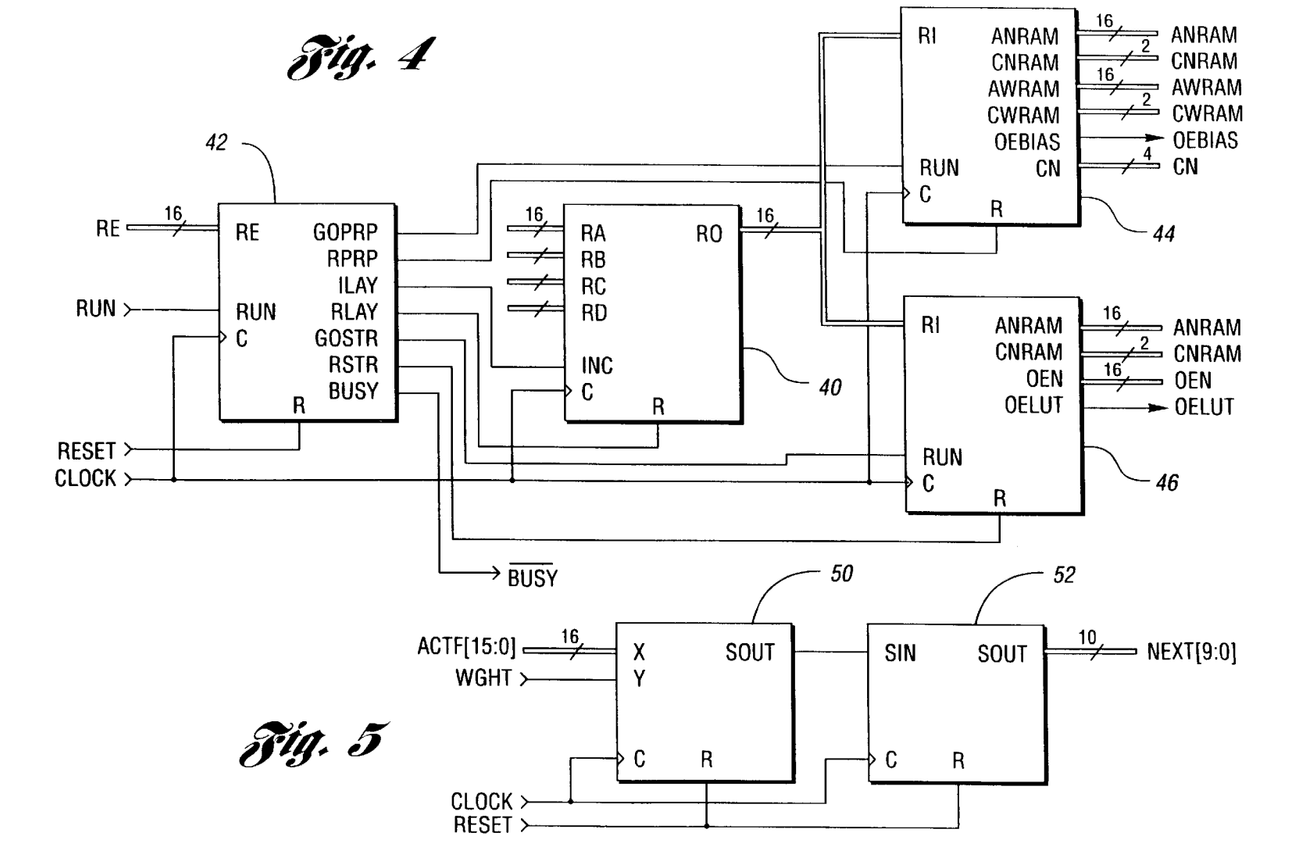
FIG. 4 is a block diagram of the run time controller of the global controller.
FIG. 5 is a block diagram of the bit-serial architecture of a neuron used in the recurrent neural network.
Figure 4:
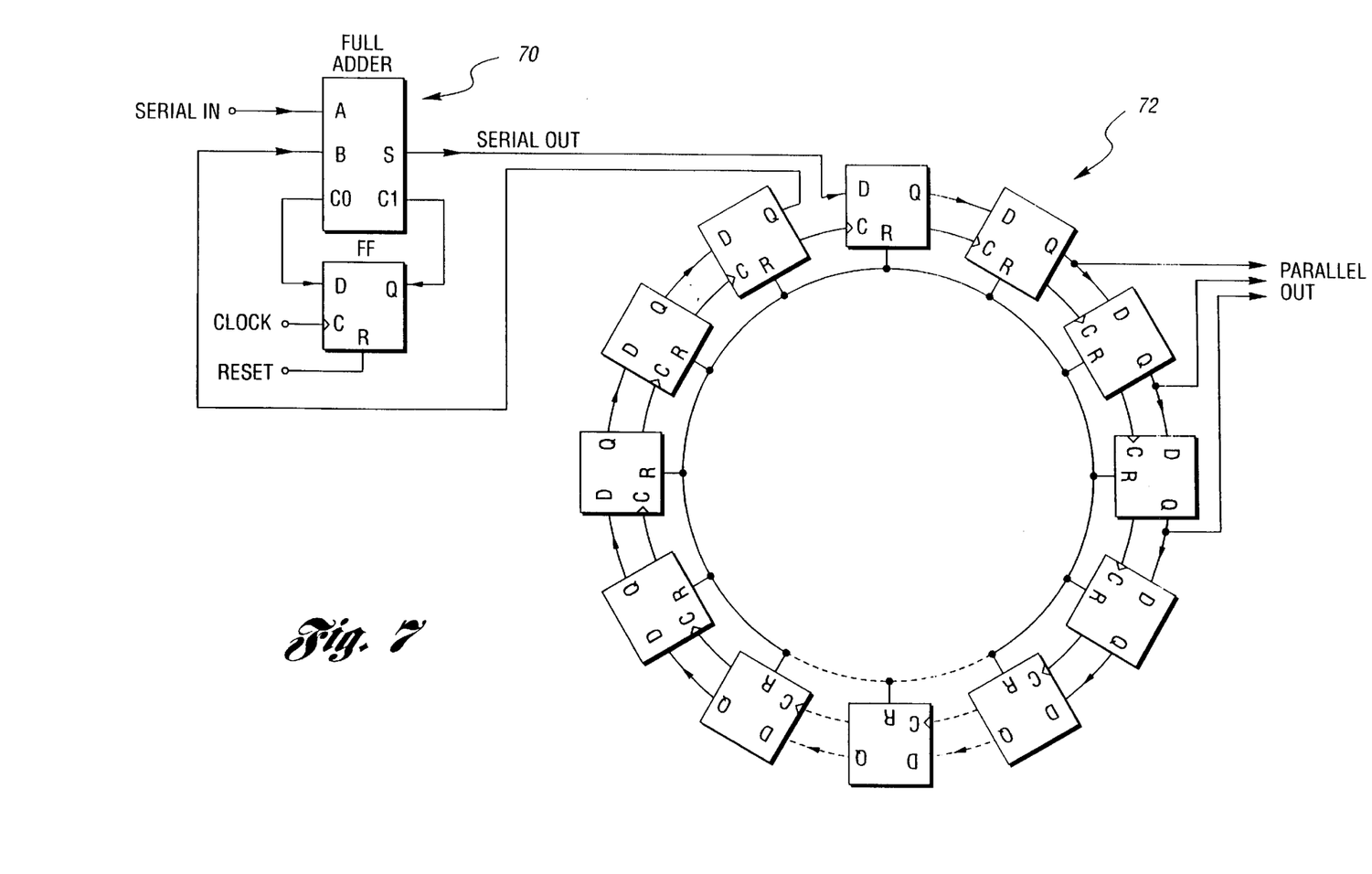

The run-time global controller 36 is shown in greater detail in FIG. 4. It is made up of four distinct logic blocks including a current layer register selector 40; a finite state machine 42 in charge of sequencing high-level inter-layer operations; an intra-layer propagation controller 44; and an intra-layer specific neuron output data storage controller 46. When the RUN command is issued to the run-time controller 36, state machine 42 begins execution by clearing the $\overline{\text{BUSY}}$ flag, the current layer register selector 40, the propagation controller 44, and the storage controller 46. The current layer controller has access to all four configuration registers, RA through RD. Upon reset, selector 40 points to the RA register (which defines the input layer topology) and thereby propagates its contents to the propagation and storage controllers, 44 and 46 respectively. The state machine 42 then passes control to the propagation controller 44 by toggling the RUN pin on controller 44 and goes into an idle mode. The role of the propagation controller 44 is to oversee the execution of the neuronal multiply and accumulates. This is achieved by providing the necessary control logic and precise synchronization of data flow out of both the neuron RAM 28 and the synapse RAM 30 into the bit-serial neurons 22. The propagation controller 44 therefore generates (1) the addresses ANRAM[5:0] and control signals CNRAM[2:0] to the neuron RAM 28; and (2) the addresses AWRAM[5:0] and control signals CWRAM to the synaptic weight RAM 30. The propagation controller 44 also generates control signals on the control lines CN[3:0] to the neuron block 22. These control signals include commands to clear the neuron multipliers and accumulators. The OEBIAS signal allows the propagation of a bias term to the neurons 20. The bias term is propagated on the data bus to the neurons 22 in much the same way as the neuron inputs from the neuron storage RAM 28. When the bias term is invoked, the neuron RAM outputs are simply tri-stated.

Upon completion of the propagation controller task, the linear activation for all neurons in the current layer have been calculated, as given by equation (1). The state machine 42 then passes execution to the storage controller 46 by toggling its RUN pin. The responsibility of the storage controller 46 is to calculate the non-linear activations for the neurons whose linear activation was just calculated and subsequently store the resulting quantities in RAM 28. This is achieved by sequentially enabling the linear output of each neuron on that layer, allowing the signal to propagate through the sigmoid activation look-up-table (LUT) 26, and storing the result in an appropriate memory location in RAM 28. Upon completion, the storage controller 46 returns control to the state machine 42. When active, the controller 42 generates the addresses ANRAM[5:0] and control signals CNRAM[2:0] to the neuron RAM 28, sequentially enables output of the active neurons via the OEN control lines, and enables access of the output from the LUT onto the neuron data input bus. When controller 42 completes execution, a full forward pass has been completed for a single layer of the recurrent neural network architecture. The state machine 42 increments internal layer counters, and checks to see if there are any additional layers in the neural network topology that need to be calculated. If there are, the above process is repeated. If all layers have been computed and the neuron outputs stored in RAM 28, the controller sets the $\overline{\text{BUSY}}$ flag, and returns to the idle mode. When the $\overline{\text{BUSY}}$ flag is high, data can be read from all RAM memory locations, and the results of the neurocomputation can be off-loaded to the external world. This completes the execution of the neurocomputation.

Referring now to FIG. 5, each neuron in the pool of neurons 22 includes a serial-parallel multiplier 50, and a bit-serial accumulator 52. The multiplier 50 is used to perform the synaptic multiplications required by the neural network architecture. In operation, the multiplier accepts as input either (1) an input stimulus to the neural network or (2) the activation output from a neuron on a previous layer. It multiplies this quantity by the corresponding synaptic weights. The input stimulus (or activation output) is presented to the multiplier in a fully parallel fashion while the synaptic weights are presented in a bit-serial fashion.

Figure 6:
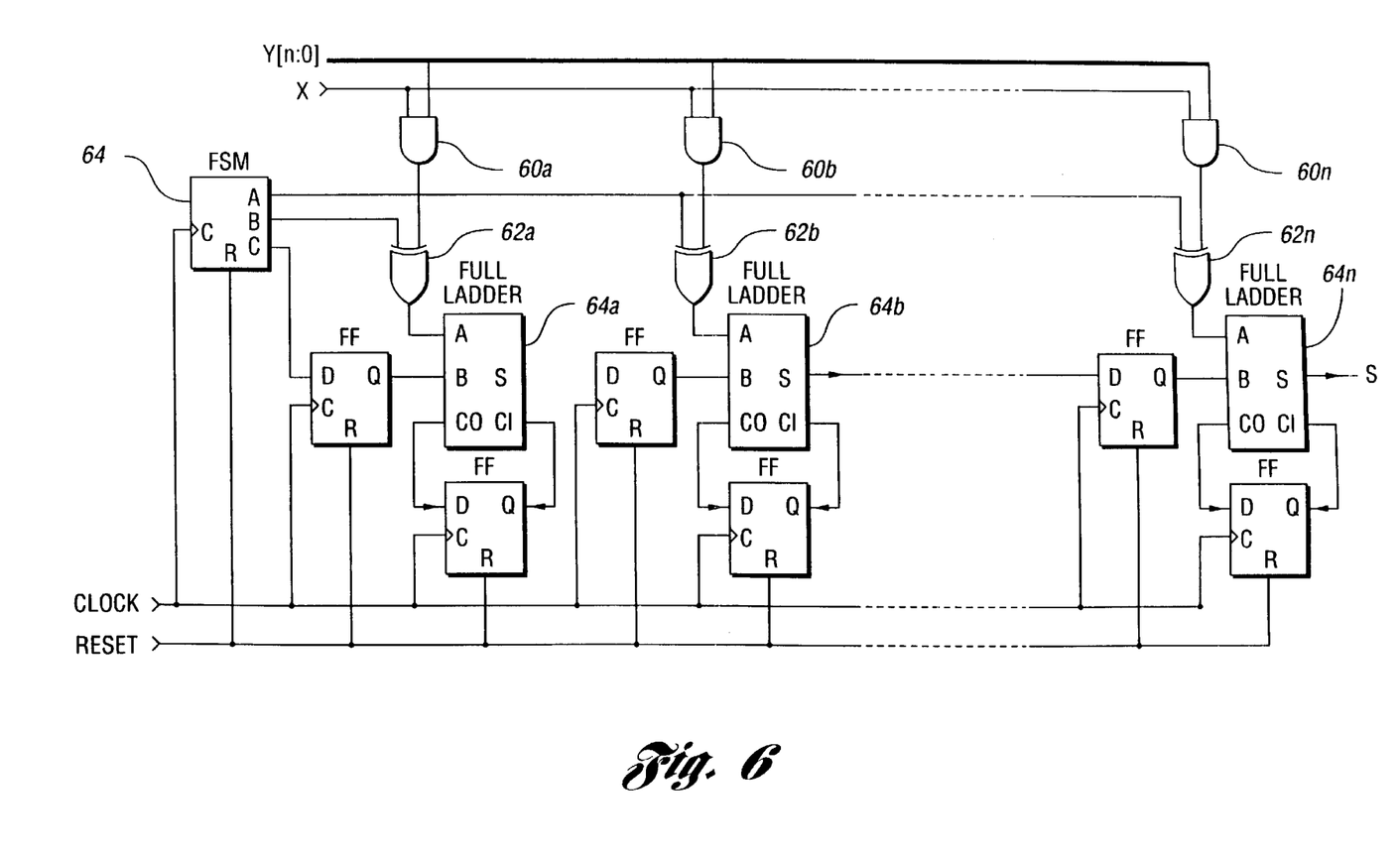
FIG. 6 is a schematic diagram of the multiplier of FIG. 5.

The serial output of the multiplier feeds into the accumulator. The multiplier 50 is shown in greater detail in FIG. 6. Any size multiplier can be formed by cascading the basic multiplier cell. The bit-wise multiplication of the multiplier and multiplicand is performed by the AND gates 60a–60n. At each clock cycle, the bank of AND gates therefore compute the partial product terms of a multiplier Y and the current multiplicand X(t). Two's complement multiplication is achieved by using XOR gates 62a–62n connected with the outputs of the AND gates and providing inputs to full adders 64a–64n. By controlling one of the inputs on the XOR gate, the finite state machine 66 can form the two's complement of selected terms based on its control flow. In general, for a nxn multiplier resulting in a 2n bit product, the multiplier can be formed using 2n basic cells and will perform the multiplication in 2n+2 clock cycles. Successive operations can be pipelined and the latency of the LSB of the product is n+2 cycles. In this implementation, n=16.

The accumulator 52 is shown in greater detail in FIG. 7 and comprises a single bit-serial adder 70 linked to a chain of flip-flops generally indicated at 72. The bit-serial adder is made up of a single full adder and a flip-flop to store the carry bit. The length of the accumulator chain is controlled by the multiplication which takes 2n+2 clock cycles to perform a compete multiplication. At each clock cycle, the accumulator sums the bit from the input data stream with both the contents of the last flip-flop on the chain as well as the carry bit, if any, generated from the last addition operation a clock cycle before. This value is subsequently stored into the first element of the chain. This creates a circulating chain of data bits in the accumulator. In operation, the adder's flip-flop is reset prior to the accumulation of a sum.

The chip architecture of the present invention may be used to compute transfer functions not ordinarily associated with neural networks, such as FIR and IIR filters. Thus, such a chip can also perform multiple functions which have been realized by conventional signal processing algorithms in real-time systems.

While the best mode for carrying out the present invention has been described in detail, those familiar with the art to which this invention relates will recognize various alternative designs and embodiments for practicing the invention as defined by the following claims.

What is claimed is:

1. A recurrent neuroprocessor for implementing a reconfigurable neural network topology including a plurality of hidden layers containing neurons interconnected in a recurrent configuration; said neuroprocessor comprising:
   a neural module including a plurality of bit-serial neurons;
   a global controller for time multiplexing groups of neurons from the neural module to form first and second hidden layers of the network topology, said global controller controlling application of an input pattern to the first hidden layer and controlling storage of the output of said first hidden layer for subsequent application as input to said second hidden layer.

2. The system defined in claim 1 wherein each neuron comprises a bit-serial multiplier for multiplying first and second inputs, said global controller sequentially applying to said first input of said multiplier one input of said input pattern or the activation output of a neuron on a previous layer, the controller applying a synaptic weight appropriate for the input pattern to said second input of said multiplier, each neuron further comprises a bit-serial accumulator for accumulating the output of said multiplier.

3. The system defined in claim 2 wherein the recurrent configuration includes unit time delays.

4. A recurrent neuroprocessor for implementing a reconfigurable neural network topology including a plurality of hidden layers containing neurons interconnected in a recurrent configuration; said neuroprocessor comprising:
   a neural module including a plurality of bit-serial neurons, each neuron comprising a bit-serial multiplier for multiplying first and second inputs and further comprising a bit-serial accumulator for accumulating the output of said multiplier;
   a global controller for time multiplexing groups of neurons from the neural module to form first and second hidden layers of the network topology, said global controller controlling application of an input pattern to the first hidden layer and controlling storage of the output of said first hidden layer for subsequent application as input to said second hidden layer;
   said global controller sequentially applying to said first input of said multiplier one input of said input pattern or the activation output of a neuron on a previous layer, the controller applying a synaptic weight appropriate for the input pattern to said second input of said multiplier;
   said input neuron activation bits being provided to the multiplier in parallel and the input synaptic weight bits being provided to the multiplier serially, the multiplier computing the product of the two inputs and making the results available to the accumulator on a bit-serial basis.

5. The system defined in claim 4 wherein said global controller comprising a configuration controller, and a run-time controller,
   said configuration controller including a plurality of configuration registers for storing data that defines the topology of each layer of the recurrent neural network architecture,
   said run-time controller initiating a neurocomputation using the data in said configuration registers.

6. The system defined in claim 5 wherein said configuration controller includes a data bus, and an address bus, and receives a configuration control signal, a clock signal, and a reset signal, the address on the address bus internally selecting a configuration register as the destination of data on the data bus.

7. The system defined in claim 6 wherein said neuroprocessor further includes a neuron state RAM module for storing the contents of the output layer of the neural network.

8. The system defined in claim 7 wherein the run-time controller comprises a current layer register selector, a finite state machine for sequencing high-level inter-layer operations, an intra-layer propagation controller for controlling execution of neuronal multiply and accumulates, and an intra-layer specific neuron output data storage controller for controlling calculation of non-linear activations for the neurons in accordance with the following equation:

$$y_j = 1 - \frac{2}{1 + e^{-x_j}}$$

and for subsequently storing the resulting quantities in the neuron state RAM.

9. The system defined in claim 8 wherein the neuroprocessor further includes a sigmoid activation look-up-table for performing the non-linear activation function.

10. The system defined in claim 9 wherein each neurons comprises a bit-serial multiplier for multiplying first and second inputs, said global controller sequentially applying one input of said input pattern or the activation output of a neuron on a previous layer to said first input of said multiplier, said global controller applying a synaptic weight appropriate for the input to said second input of said multiplier, each neuron further comprises a bit-serial accumulator for accumulating the output of said multiplier.

11. The system defined in claim 10 wherein the input neuron activation bits are provided to the multiplier in parallel and the input synaptic weight bits are provided to the multiplier serially, the multiplier computing the product of the two inputs and making the results available to the accumulator on a bit-serial basis.

12. The system defined in claim 11 wherein the accumulator comprises a cyclical shift register with an adder at the input stage.

13. The system defined in claim 12 wherein the neuron state RAM module is a single port RAM module.

14. The system defined in claim 13 wherein said input pattern includes a bias input.

15. A recurrent neuroprocessor for implementing a reconfigurable network topology including a plurality of hidden layers containing neurons interconnected in a recurrent configuration; said neuroprocessor comprising:
   a neural module including a plurality of bit-serial neurons;
   a global controller for time multiplexing groups of neurons from the neural module to form first and second hidden layers of the network topology, the controller controlling application of the input pattern to the first hidden layer and controlling storage of the output of said first hidden layer for subsequent application as input to said second hidden layer;

said global controller comprising a configuration controller;

said configuration controller including a plurality of configuration registers containing data that explicitly defines the topology of respective ones of said layers of the recurrent neural network architecture including the number of neurons and the number of recurrent connections within respective layers;

said global controller including a run-time controller for initiating a neurocomputation using the data in said configuration registers, and a neuron state RAM module for storing the contents of the output layer of the neural network;

said run-time controller comprising a current layer register selector, a finite state machine for sequencing high-level inter-layer operations, an intra-layer propagation controller for controlling execution of neuronal multiply and accumulates, a sigmoid activation look-up-table for performing a non-linear activation function and an intra-layer specific neuron output data storage controller for controlling calculation of non-linear activations for the neurons and for subsequently storing the resulting quantities in said neuron state RAM.

* * * * *